June 4, 1929.                L. V. FOSTER                1,716,308
                         MICROSCOPE CONDENSER
                          Filed Feb. 14, 1927

INVENTOR
LEON V. FOSTER.
BY
his ATTORNEYS

Patented June 4, 1929.

1,716,308

UNITED STATES PATENT OFFICE.

LEON V. FOSTER, OF ROCHESTER, NEW YORK, ASSIGNOR TO BAUSCH & LOMB OPTICAL COMPANY, OF ROCHESTER, NEW YORK, A CORPORATION OF NEW YORK.

MICROSCOPE CONDENSER.

Application filed February 14, 1927. Serial No. 168,131.

This invention relates to improvements in lens means for illuminating the field of view of a microscope. More particularly, it has reference to such lens means of the variety adapted to provide dark field illumination.

One object of the invention is to provide a lenticular element of novel design, for a microscope condenser, whereby efficient dark ground illumination is obtained and the usefulness and convenience of the condenser is increased.

Another object is to provide a microscope condenser with interchangeable lens means whereby dark field or light field illumination may be provided as desired.

A further object is to provide a microscope condenser combining light collecting means with supplemental efficient lens means for dark field illumination capable of affording a dark field illumination cone of wide numerical aperture range.

Another object is to provide a microscope condenser with interchangeable par-focal lens means whereby light field or dark field illumination may be produced and light rays passing through the condenser are always brought to the same focus.

Other objects and advantages reside in certain novel features of construction, arrangement and combination of parts which will be hereinafter more fully described and pointed out in the appended claims.

Referring to the drawings.

Similar reference numerals refer to the same parts throughout the several figures of the drawings.

Figure 1:
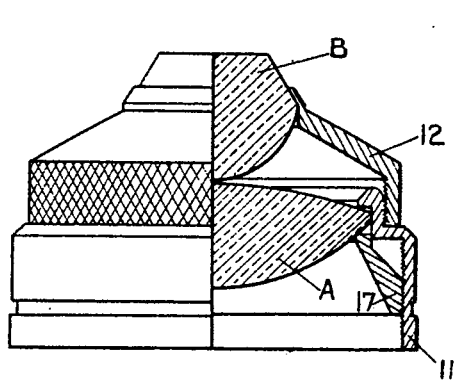
Fig. 1 is a side view, partly in section, of a well known form of microscope condenser.

The condenser shown in Fig. 1 is of a common type and is known as an Abbe condenser. It comprises a bi-convex collecting lens member A, retained by threaded member 17 in a ring mounting 11 and a cooperating lens member B of the shape shown in the drawing held in a mounting 12. The mounting 12 is detachably secured to mounting 11 by a screw thread connection thus permitting removal of the mounting 12 together with lens B.

The form of condenser just described is widely used for the purpose of providing what is known as light field illumination. Certain microscopic examinations, however, are best carried out by means of dark field illumination, and in this practice, the illumination is provided by the oblique rays while the central direct rays are stopped out so they do not reach the objective lens of the microscope. In adapting the Abbe condenser, shown in Fig. 1, for dark field illumination, it has been customary to use a dark ground stop. In its simplest form, the dark ground stop comprises a round, opaque, metal disk which is positioned centrally and below the collecting lens A. This disk serves to stop out most of the central direct rays and although it provides a fairly good dark field illumination when used with a microscope objective of low power, best results are not obtained with high power objectives on account of spherical aberration and the transmission of some diffused central rays.

My invention provides an improved and more efficient lens element for dark field illumination which may be arranged for use interchangeably in a condenser such as that shown in Fig. 1, for example, to thus furthermore provide a condenser for light field illumination which may be converted, at will, into an efficient dark field illuminator which will give good results when used with microscope objectives of all powers. To this end my improved lens member may be secured in a mounting which is adapted to be interchanged with the upper or B lens of a light field condenser such as shown in Fig. 1.

Figure 2:
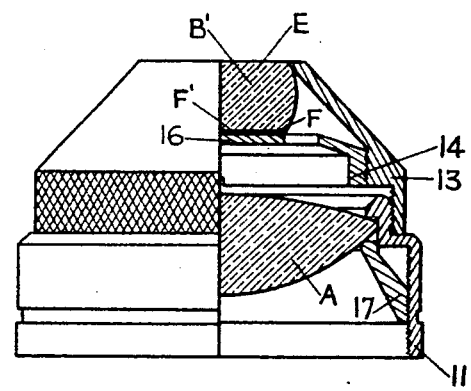
Fig. 2 is a side view, partly in section, of a microscope condenser embodying my invention.
Figure 3:
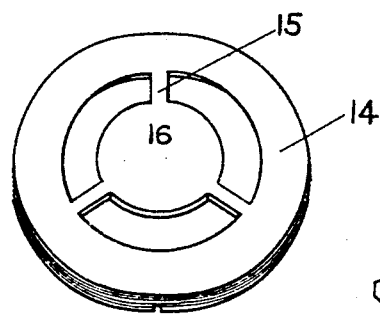
Fig. 3 is a perspective view of a lens-retaining member.

Figure 2 shows at B' a preferred embodiment of my improved lens member which, in this instance, is made of a single piece of glass and is in the form of a frustum of a sphere having upper and lower parallel faces E and F. The lower face F is ground and covered with an opaque coating shown somewhat exaggerated at F', so as to positively prevent any light rays from passing directly through the lower face of the lens member to the microscope objective. Lens element B' is preferably secured in a detachable mounting 13 which is interchangeable with the mounting 12, Figure 1, so that supplemental lens B' may be positioned to cooperate with collecting lens A.

The lens member B' is retained in mounting 13 by means of a threaded ring 14 having a spider structure 15 including a central disk 16. Disk 16 bears against the lower face of the lens member B' and presses the upper beveled edge of the lens to its seat about the edge of the circular opening in mounting 13, thereby securing the lens in place.

Figure 4:
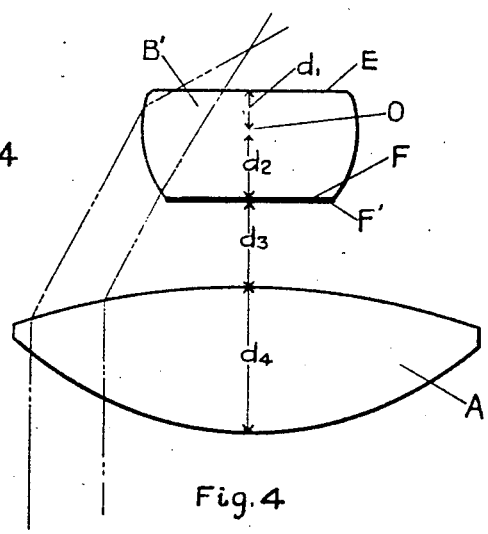
Fig. 4 is a diagrammatic view showing the relation of the optical elements of the condenser of Fig. 2.

Fig. 4 shows a diagram of the dimensions and relations of the lens members of the condenser of Fig. 2, wherein O is the center of curvature of lens B'. The dimensions, for example, may be as follows: $d_1=2.8$ mm.; $d_2=3.6$ mm.; $d_3=5.6$ mm.; $d_4=10.0$ mm.; the radius of curvature of lens B'=7.2 mm.; the radii of lens A are 51.0 mm. and 22.0 mm. for the upper and lower faces, respectively, and the diameter of lens A is 31.0 mm.

My improved lens element B' is designed so that it is par-focal with the removable lens member B of a light field condenser, such as shown in Fig. 1, for example. Thus, light rays passing through the lens system of the condenser of Fig. 1 are focused at the same point as light rays passing through the lens system of condenser of Fig. 2. On the usual microscope, the condenser is mounted in a movable sub-stage ring which contacts with an upper limit stop when the condenser is properly focused for use. Since the interchangeable lens members B and B' are par-focal, it follows that when the sub-stage ring contacts with the upper limit stop the condenser will be in focus irrespective of whether the dark field or light field lens combination is used. This affords great convenience in use and permits of ease and rapidity of adjustment when changing from light field to dark field illumination or vice versa.

In use, the condenser is attached to the sub-stage of a microscope in the usual manner and when it is desired to change from light field to dark field illumination, it is only necessary to unscrew mounting 12 carrying lens B and replace it with mounting 13 carrying lens B', or vice versa. No light rays from lens A pass through the lower face of lens member B' directly to the microscope objective because of the opaque covering on the lower face of lens B'. The supporting disk 15 may be relied upon as a stop but I prefer to use also the opaque surfacing F' described above. All light rays from collecting lens A which enter lens B' are incident upon the spherical surface of lens B', and as shown diagrammatically on Fig. 4, are refracted from the sides toward the center at substantial angles with the axis which is the desired condition for dark field illumination.

By means of my improved lens member, I am able to provide the effective dark field illumination described above and furthermore to provide such illumination in the form of a hollow cone consisting of light from 0.90 to 1.49 numerical aperture, which is a much greater range than is possible with the usual Abbe condenser and dark ground stop, hereinbefore described. Although I have shown my invention as used with a condenser having a single collecting lens, it is to be understood that my improved lens member can be used, equally well, with a condenser having a collecting system comprising a plurality of optical elements, the dimensions of my lens member being, of course, properly chosen to produce the desired results.

From the foregoing description, it will be noted that I am able to attain the objects of my invention and provide a convenient means whereby a microscope condenser can be efficiently adapted for light or dark field illumination. It is to be understood that the foregoing description and accompanying drawings are to be interpreted as illustrative only and not in any limiting sense.

I claim as my invention:

1. In a microscope condenser for dark field illumination, a lens member having opposed faces, one of which is opaque, said faces being connected by a circumferentially extending curved surface at which the light is received and refracted to the other of said faces.

2. In a microscope condenser for dark field illumination, a frusto-spherical lens member having two parallel faces and a continuous light-receiving surface, one of said faces being opaque.

3. A microscope condenser for dark field illumination comprising a bi-convex collecting lens and a frusto-spherical lens member, the optical axis of said collecting lens being perpendicular to the parallel faces of said lens member, that one of the said parallel faces adjacent to the collecting lens being opaque.

4. A microscope condenser for dark field illumination comprising light collecting means and a lens member having opposed faces, the face adjacent the collecting means being opaque, and a circumferentially extending curved surface between the said faces at which the light is received and refracted through the other of said faces.

5. A microscope condenser for dark field illumination comprising light collecting means and a frusto-spherical lens member, said member having two parallel faces arranged perpendicular to the optical axis of said collecting means, that one of said parallel faces adjacent the collecting means having an opaque covering.

6. A microscope condenser comprising light collecting means and a lens member spaced therefrom, said member having two faces and a spherical light receiving surface, that one of said faces adjacent said collecting means being opaque.

7. A microscope condenser comprising a bi-convex collecting lens and a frusto-spherical lens member spaced therefrom, said member having two parallel faces and a light-receiving surface, the face adjacent said collecting lens being opaque.

8. A microscope condenser comprising light collecting means and a frusto-spherical lens member spaced therefrom, said member having two parallel faces and a spherical light-receiving surface, the optical axis of said light collecting means being perpendicular to said faces, the face adjacent said collecting lens having an opaque covering, whereby light rays from said light collecting means which are refracted by said lens member are incident only upon said spherical light-receiving surface.

9. In a microscope condenser having a lens member carried on a mounting, the combination with a base, of an attachment comprising a lenticular element having a continuous light receiving surface and two parallel faces, one of which is opaque, and a mounting for said lenticular element, said base being provided with means for selectively receiving either said lens member mounting or said lenticular element mounting at will, so that said lenticular element mounting is interchangeable with the mounting of said lens member.

10. In a microscope condenser having a lens member carried on a mounting, the combination with a base, of an attachment comprising a frusto-spherical lenticular element having an opaque face and a curved light receiving surface and a mounting for said lenticular element, said base being provided with means for selectively receiving either said lens member mounting or said lenticular element mounting at will, so that said lenticular element mounting is interchangeable with the mounting of said lens member, said lens member being par-focal with said lenticular element.

11. In a microscope condenser having a lens member carried on a mounting the combination with a base containing a collecting lens, of an attachment comprising a frusto-spherical lenticular element having two parallel faces, the lower one of which is opaque and a mounting for said lenticular element, said base being provided with means for selectively receiving either said lens member mounting or said lenticular element mounting at will, so that said lenticular element mounting is interchangeable with the mounting of said lens member whereby the lenticular element is adapted to cooperate with said collecting lens to form a dark field condenser.

12. A microscope condenser comprising a mounting, a bi-convex lens carried by said mounting, a second mounting detachably secured to said first mentioned mounting, a lenticular element having a spherical light-receiving surface and parallel faces, means secured to said second mounting for holding said lenticular element therein, the optical axis of said lens being perpendicular to said faces, the face adjacent said lens being opaque.

13. In a microscope condenser, the combination of a mounting, a lens member having parallel faces and a curved light-receiving surface, and a spider structure having a central disk and detachably secured to said mounting, said disk bearing against the lower face of said lens member to hold it in said mounting.

14. In a microscope condenser, the combination of a mounting, a collecting lens carried by said mounting, a second mounting detachably secured to said first mounting, a frusto-spherical element carried by the said second mounting having the parallel faces thereof arranged perpendicular to the optical axis of said collecting lens, and means comprising an opaque disk carried by one of said mountings between said collecting lens and frusto-spherical element.

LEON V. FOSTER.